(12) United States Patent
Wright

(10) Patent No.: US 8,948,509 B2
(45) Date of Patent: Feb. 3, 2015

(54) BLENDING WITH MULTIPLE BLEND MODES FOR IMAGE MANIPULATION

(71) Applicant: Adobe Systems Incorporated, San Jose, CA (US)

(72) Inventor: Timothy N. Wright, Minneapolis, MN (US)

(73) Assignee: Adobe Systems Incorported, San Jose, CA (US)

( * ) Notice: Subject to any disclaimer, the term of this patent is extended or adjusted under 35 U.S.C. 154(b) by 149 days.

(21) Appl. No.: 13/678,384

(22) Filed: Nov. 15, 2012

(65) Prior Publication Data

US 2014/0133748 A1    May 15, 2014

(51) Int. Cl.
 *G06K 9/00* (2006.01)
 *G06T 11/00* (2006.01)
 *G06T 11/40* (2006.01)

(52) U.S. Cl.
 CPC ............. *G06T 11/00* (2013.01); *G06T 11/40* (2013.01)
 USPC ...................................................... 382/167

(58) Field of Classification Search
 None
 See application file for complete search history.

(56) References Cited

U.S. PATENT DOCUMENTS

| | | | |
|---|---|---|---|
| 5,687,306 A * | 11/1997 | Blank | 345/634 |
| 6,239,807 B1 * | 5/2001 | Bossut | 345/582 |
| 6,269,196 B1 | 7/2001 | Hamburg | |
| 6,396,959 B1 | 5/2002 | Hamburg | |
| 6,421,460 B1 | 7/2002 | Hamburg | |
| 6,803,923 B1 | 10/2004 | Hamburg | |
| 6,856,323 B2 * | 2/2005 | Moore | 345/629 |
| 6,903,751 B2 * | 6/2005 | Saund et al. | 345/619 |
| 7,136,069 B1 * | 11/2006 | Dawson | 345/582 |
| 7,184,055 B2 | 2/2007 | Hamburg | |
| 7,483,042 B1 * | 1/2009 | Glen | 345/629 |
| 8,069,466 B2 * | 11/2011 | Shelton et al. | 725/134 |
| 8,717,377 B2 * | 5/2014 | Tawaraishi et al. | 345/582 |
| 2001/0020956 A1 * | 9/2001 | Moir | 345/765 |
| 2002/0145615 A1 * | 10/2002 | Moore | 345/629 |
| 2007/0041611 A1 * | 2/2007 | Hersch et al. | 382/100 |
| 2007/0052728 A1 * | 3/2007 | Hamburg | 345/629 |
| 2009/0249393 A1 * | 10/2009 | Shelton et al. | 725/39 |
| 2010/0027961 A1 * | 2/2010 | Gentile et al. | 386/52 |
| 2011/0080407 A1 * | 4/2011 | Duluk et al. | 345/426 |
| 2012/0284594 A1 * | 11/2012 | Norwood et al. | 715/202 |
| 2013/0156318 A1 * | 6/2013 | Beckman | 382/190 |

OTHER PUBLICATIONS

Porter, Thomas, et al., "Compositing Digital Images", Computer Graphics, vol. 18, No. 3, (Jul. 1984), 1-7.

* cited by examiner

*Primary Examiner* — Bhavesh Mehta
*Assistant Examiner* — Feng Niu
(74) *Attorney, Agent, or Firm* — Shook, Hardy & Bacon L.L.P.

(57) ABSTRACT

In various example embodiments, a system and method are provided for blending a group of layers with multiple blend modes such that additional style layers are applied to the layer group's combined shape, and clipped as if the style layers were applied to a single layer with the combined transparency of the group's layers. In example embodiments, for each of a plurality of layers: a group background is blended behind a group buffer, one of the plurality of layers is blended on top of the group buffer while ignoring a transparency of the group buffer, and the background is factored out from the group buffer. When the blending is complete, a style or effect is applied to the blended layers, and the background is blended behind the group result such that the group result transparency such that the style is clipped to the group result.

20 Claims, 6 Drawing Sheets

BLENDING WITH MULTIPLE BLEND MODES FOR IMAGE MANIPULATION

FIELD

The present disclosure relates generally to compositing, blending or morphing layers of graphical image data.

BACKGROUND

Many graphics or image processing computer programs, such as Adobe® Photoshop®, available from Adobe Systems Incorporated, of San Jose, Calif., build a final image by compositing two or more image layers together. The image layers may be thought of as stacked sheets of acetate. The density of the ink on the acetate controls the transparency of the sheet, e.g., the extent to which that sheet obscures the images from the underlying sheets. In a computer program, the color and density of the ink on the acetate sheet are represented by a color value and an alpha value (representing opacity), respectively. Normally, an alpha value of zero means the corresponding region is fully transparent, and a value of one means it is fully opaque.

Each layer typically includes image data and compositing controls. Typically, the image data is represented by an array of pixels, with each pixel having a color and, optionally, an opacity. Similarly, if there is a mask, the mask is represented by an array of pixels, with each pixel having an opacity. Alternatively, the image data or the mask or both can be defined analytically, e.g., by using shape outlines, or by other functions which map positions to color and opacity. In addition, the image data and the mask can be dynamic, that is, computed from other data at the time the layers are composited.

The compositing controls may include a transfer mode, also known as a blending mode. The transfer mode of an image layer determines how the color in the image layer mixes with the color accumulated from the underlying layers in the same image position. More specifically, it is a recipe for blending colors that can be expressed as a function taking an upper color and lower color to produce a third color. Image manipulation computer programs, such as Photoshop®, generally provide a wide variety of predefined transfer modes. The basic transfer mode equation is:

$$\text{new\_color} = \alpha \cdot T(\text{lower\_color}, \text{upper\_color}) + (1-\alpha) \cdot \text{lower\_color}$$

where α is the opacity of the upper layer, T is the selected transfer mode function, and lower_color and upper_color are the color values of the lower layer (which in some contexts is called the accumulation layer) and the upper layer for the graphical element whose color (new_color) is being calculated. The color values are not pre-multiplied by the opacity. Transfer modes should not be confused with the well-known Porter-Duff compositing operations, which define how the alpha values determine how much of the blended colors survive in the result, but which assume generally normal mode color mixing. (T. Porter and T. Duff, "Compositing Digital Images", SIGGRAPH 84, pp. 253-59 (1984).)

In this specification, the terms "color," "alpha," and "graphic element" are used. A color is a representation of a particular color. The representation can be in any form suitable for computation and need only have the property that colors can be interpolated. Alpha is a quantity that characterizes the opacity of a graphic element. An alpha value of zero indicates total transparency. An alpha value of one indicates complete opacity. When working with graphic elements described with a color and alpha value, the color is free to be undefined or arbitrary if the alpha value is zero. A graphic element is a piece of the compositing process. Two graphic elements each having a color and alpha value are composited to produce a third graphic element. In a raster context, the primitive graphic element is a pixel. In a vector graphics context, it could be a region of solid color, such as a region defined by a PostScript path.

Additional information, and example techniques for blending graphic elements, is discussed in commonly owned U.S. Pat. Nos. 6,421,460 and 7,184,055, which are hereby incorporated by reference herein in their entirety.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that example embodiments of the inventive subject matter may be practiced without these specific details. In general, well-known instruction instances, protocols, structures, and techniques have not been shown in detail.

Example embodiments described herein provide systems and methods for combining a group with multiple layers of image data with individual blend modes and applying a style to the group of layers as a whole, the style being clipped to the group boundaries.

Figure 1:
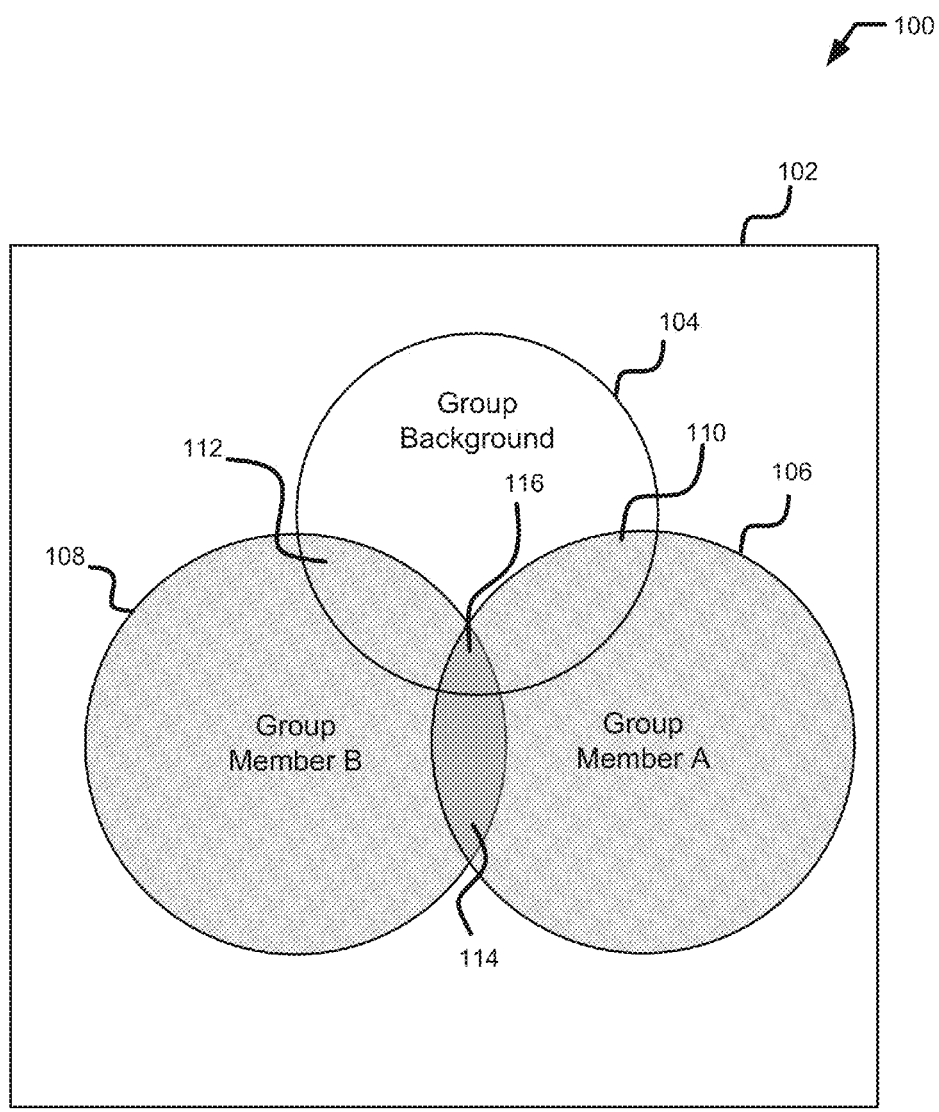
FIG. 1 is an example illustration of overlapping graphical elements.

FIG. 1 is an example illustration 100 of overlapping graphical elements (e.g., layers) in a frame 102. A group background 104 is shown partially overlapped by a first group member 106 and a second group member 108. The group members 106 and 108 may include discrete graphical elements such as a single solid color or an individual graphical layer, or multiple layers that have been composited (e.g., blended) together to form the group member.

The first group member 106 is shown to overlap the group background 104 in a region 110. The second group member 108 is shown to overlap the group background 104 in a region 112. The first group member 106 and the second group member 108 are shown to overlap in a region 114. The first group member 106, the second group member 108, and the group background 104 all overlap in a region 116. Each of the overlapping regions 110, 112, 116 and 116 may be defined by one or more transforms (e.g., blend modes or transform modes) of the separate group members (e.g., group members 106 and 108). The one or more transforms may be utilized to select one of the group members, or to blend the separate group members into a composite layer. The layers may be blended together and then treated as a single layer with a single blend mode.

Figure 2:
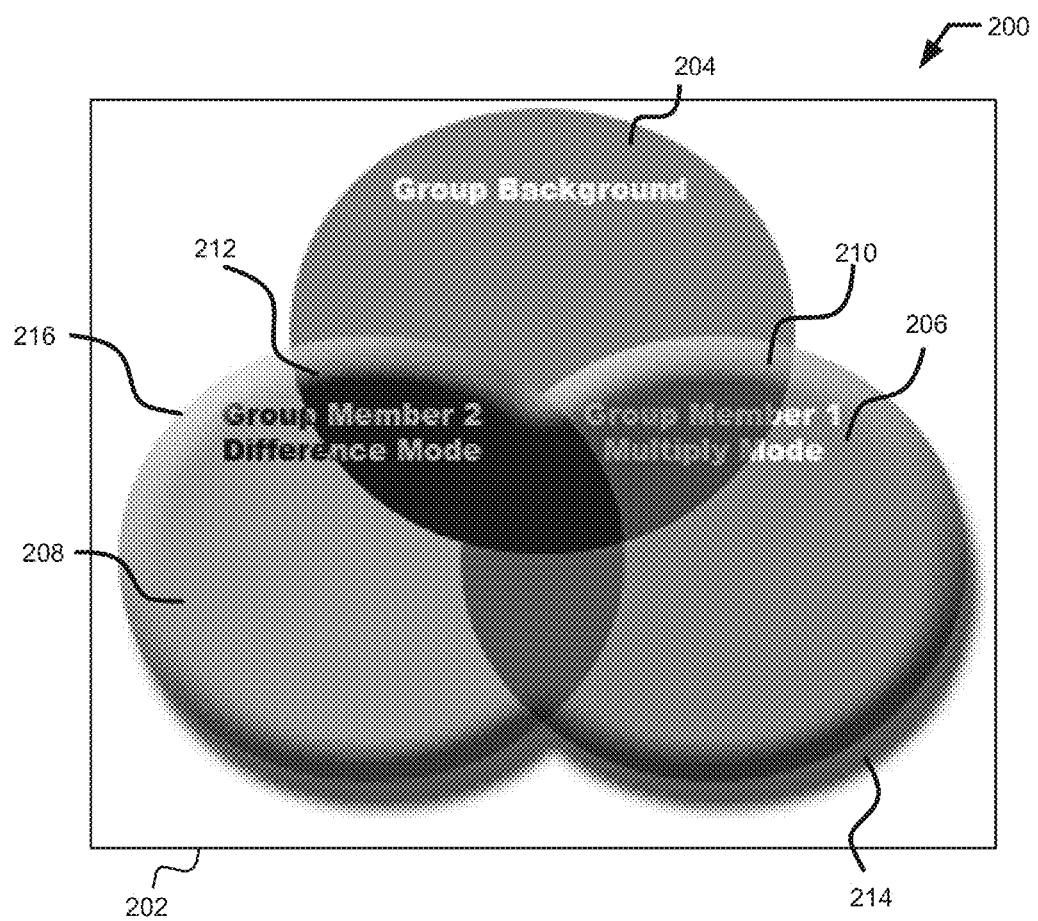
FIG. 2 is an example illustration of overlapping graphical elements with clipped pass-through style, according to example embodiments.

FIG. 2 is an example illustration 200 of overlapping graphical elements (e.g., layers) in a frame 202. A group background 204 is shown to be partially overlapped by a first group member 206 and a second group member 208. The group members 206 and 208 may include discrete graphical elements, such as a single solid color or an individual graphical layer, or multiple layers that have been composited together for forming the group member.

The first group member 206 is shown to overlap the group background 204 at a region 210. The second group member 208 is shown to overlap the group background 204 at a region 212. The first group member 206 and the second group member 208 are both shown to include a drop shadow effect 214. The first group member 206 and the second group member 208 are both shown to include a highlighted rounded bevel effect 216.

Figure 3A:
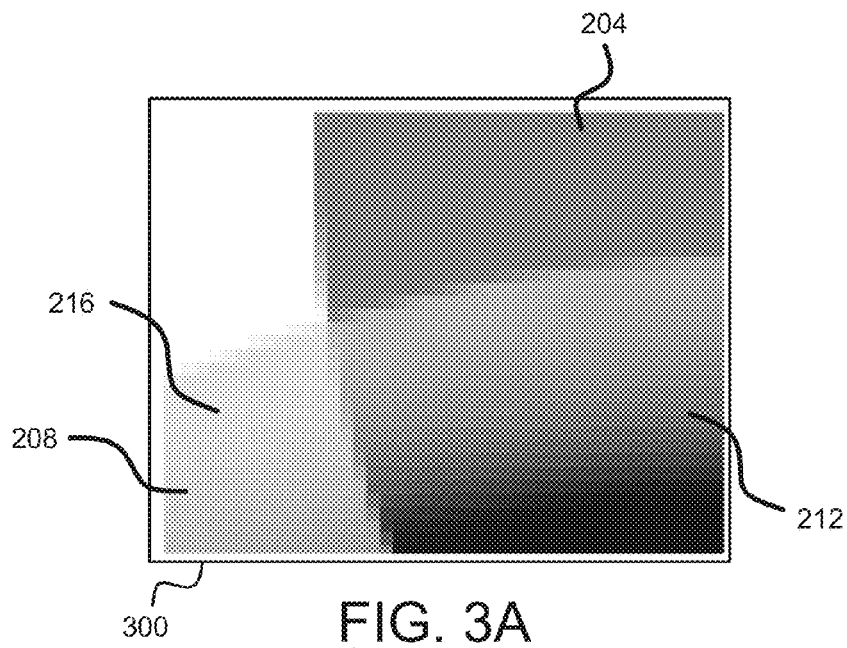
FIGS. 3A and 3B are magnified excerpts of graphical elements in FIG. 2.

FIG. 3A is an excerpt 300 from illustration 200 of FIG. 2 depicting overlapping graphical elements and the group background 204. The second group member 208 is shown to overlap the group background 204 at a region 212. Both the second group member 208 and the region 212 are shown to include the highlighted rounded bevel effect 216. In an example, the highlighted rounded bevel effect 216 is applied to the second group member 208 and the region 212, after the first group member 206 and the second group member 208 are blended at the region 212, such that any undesirable artifacts or fringing are not introduced between the second group member 208 and the group background 204.

Figure 3B:
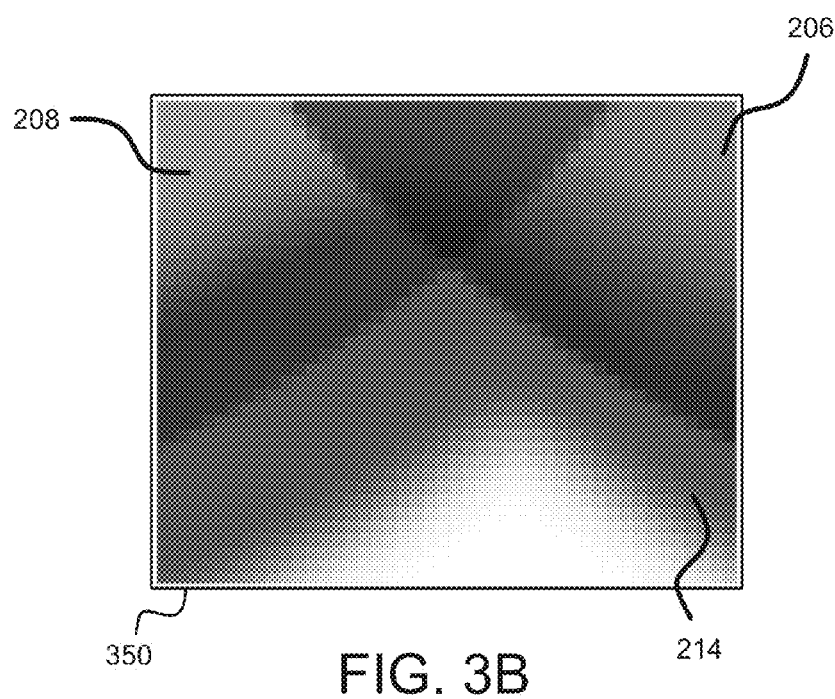

FIG. 3B is an excerpt 350 from illustration 200 of FIG. 2 depicting two overlapping graphical elements. The second group member 208 is shown to overlap the first group member 206. Both the second group member 208 and first group member 206 are shown to include the drop shadow effect 214.

Figure 4:
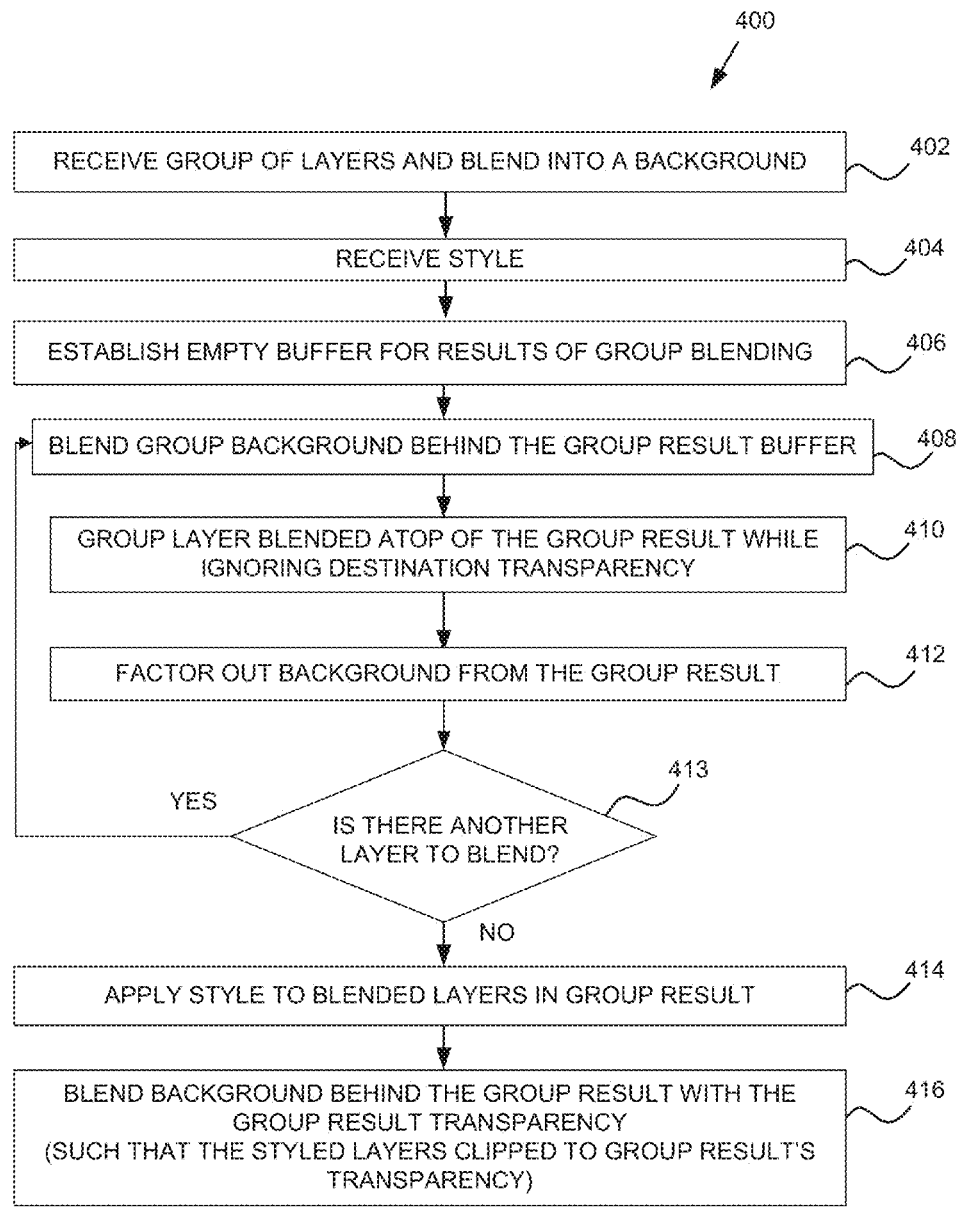
FIG. 4 is a flow diagram illustrating an example method, in accordance with an example embodiment, for combining multiple image layers with a style element.

FIG. 4 is a flow diagram illustrating an example method 400 for combining multiple image layers with a style effect. In general, the example method includes blending a group of layers (e.g., a layer group) with multiple blend modes such that one or more additional style effects or layers, e.g., color overlays, shadows, or bevels, may be applied to the layer group's combined shape, and clipped as if the style layers were applied to a single layer with the combined transparency of the group's layers. In this manner unwanted color fringes at the borders of the group of layers or a background may be reduced or eliminated. The example method 400 also allows for the blending to remain faithful to a non-styled passthrough blending case, for example, by reducing rounding errors where the group shape is transparent. The reduction of rounding errors may useful in situations where the dynamic range of the pixel colors is limited, for example to 8-bit color values.

In the example method 400, a group of layers and a background may be received (individual layers may be the result of earlier blending), and at operation 402 the results of any initial blending may be saved as a background. At operation 404 a style is received for application on the group of layers. At operation 406, an empty buffer, e.g., a null buffer, may be set aside for the results of further group blending and the application of one or more styles to the layers. An empty buffer may be a buffer that has no image data in it, e.g., null or all zeros, or a buffer where any data in the buffer is replaced upon an initial use. In general, a buffer may be any tangible computer (e.g., processor) readable location capable of storing image data. For example, a buffer may include random access memory, static memory, dynamic memory, a flash memory, an optical or magnetic drive, or any other compatible readable storage medium.

Before each group layer is blended in the group blending result, at operation 408, the group background (e.g., a backdrop behind the group) is blended behind the group result. At operation 410, the group layer is blended atop the group result while ignoring the destination transparency. Atop is an example blending arithmetic mode that is described in Porter & Duff, "Compositing Digital Images" (1984). At operation 412, the background is then factored out of the group result using a three-way blend formula, so that the background blended behind the group result gives the same result as blending the group layers normally in turn against the background. At operation 413, a check is performed to determine if there is another layer to be blended. If another layer is to be blended, then operations 408, 410 and 412 are repeated.

When all layers are blended, at operation 414, the style layers are then applied to the group result, which has the background factored out, while ignoring the group's shape. Finally, at operation 416, the background is blended behind the group result with the group result transparency, so that the styled layers are clipped to the group result's transparency.

In an example, the group layers may be blended in a tile-by-tile manner, and one or more optimizations may be applied depending on the transparency of the group result and the current group layer being blended. For example, if a group layer is transparent in the current tile, then the blending is unnecessary and may be skipped. In an example, if the layer's blend mode is normal or revert, or the background is transparent in the current tile, then the group layer is simply blended with its mode into the group blending result. In an example, if the group layer's transparency is opaque in the current tile, after the group background is blended behind the group result, and the layer is blended atop (as in the general case), the layer is blended behind the group result.

In an example, nested layer groups may be recursively handled. The background of the nested group may be used as the current group blending result, with the backgrounds of the outer groups placed behind the current group blending result.

In an example of blending each layer in a group of layers into a group buffer, first, a group background is blended behind the current group buffer and stored into a group accumulation buffer. The group layer is then blended on top of the group accumulation buffer using a desired formula for the layer's blend mode, but ignoring the destination transparency (e.g., blending the layer atop the accumulation buffer). The transparency of the group accumulation buffer is then set to the screen of the layer and group buffer, while ignoring the group background. Then the source layer is blended behind the group accumulation buffer.

If the source layer is transparent, a three-way blend is done among the source/background and the blended result. When all of the layers are blended in sequence into the group accumulation buffer, then the additional layers and the styles may be clipped to the group and blended into the group accumulation buffer, while ignoring the group transparency mask. Finally, the finished group accumulation buffer is blended using a blend revert mode and the group buffer transparency against group background.

Regions inside the group of layers (e.g., the group shape) may have a transparency of 1.0 and show pass-through blending as in the non-styled case. The regions of the group that are outside the group of layers shape have a transparency of 0.0 and show the group background. Areas that have a transparency between 1.0 and zero my include a blurry edge that may either include an anti-aliased sharp edge of a vector shape, or a partially transparent group such as the clipped group styles. This action treats the group accumulation buffer as a single layer for layer effects (e.g., style) purposes. Examples of styles may include inner and outer drop shadows, bevels, and inner and outer glows. The style my include a shape that is calculated using the group shape (transparency), and a single color, pattern or gradient. A style may also be another layer (such as a clipped layer group).

Figure 5:
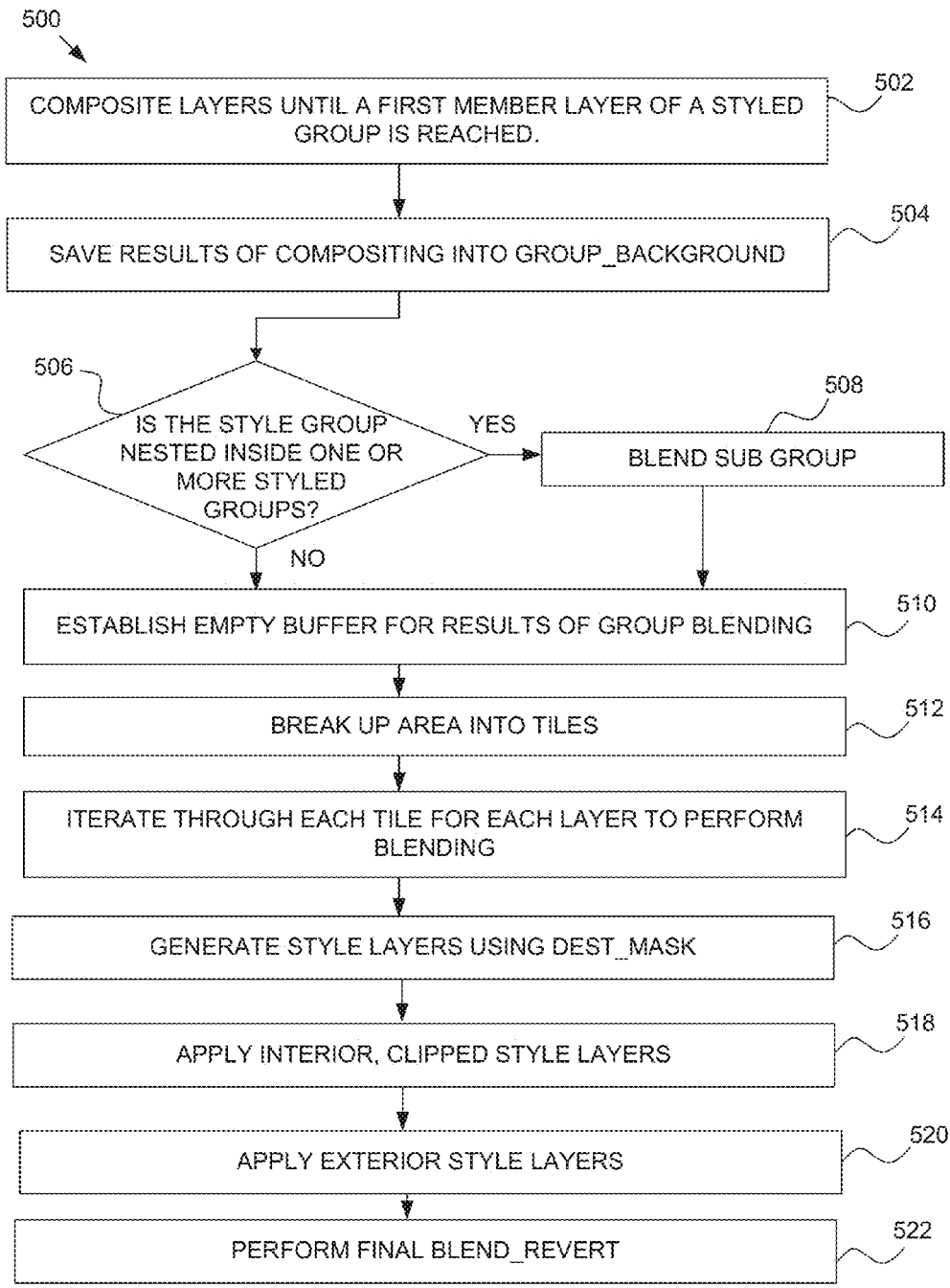
FIG. 5 is a flow diagram of an example method, in accordance with an example embodiment, for providing clipped pass-through group styles with three-way background blending.

FIG. 5 is a flow diagram of an example method 500 for providing clipped pass-through group styles with three-way background blending. At operation 502, a scan through the group layers is made to see if all layers use Normal mode, or if all the blend modes are the equivalent of Normal mode (e.g., an all black layer that uses Multiply mode, or an all white layer that uses Screen mode), in which case the group layers are blended (e.g., "isolated") into an empty group buffer and treated as a single layer for style purposes. Otherwise, the group layers are blended using a "pass-through" method. A pass-through method may include the individual member layer blend modes considering the layers below the group, as opposed to "isolated" where the member layers are first blended against a transparent backdrop, and then that result is blended as a single layer against the layers below the group.

At operation 504, results of compositing are saved into a group_background buffer (e.g., the buffer or layer against which the layer members are blended). At operation 506, a check is made to determine if this styled group is nested inside one or more styled groups. If there is a nested style group, at operation 508, the sub group is blended. For example, each group_background of each enclosing styled group is blended together in z-order using a blend_revert operation, and then another blend_revert is performed with the result being placed in the current destination buffer. In other words, all the enclosing groups' background are blended behind one another to obtain the inner group background.

To illustrate the example, if group_background_1 is the outermost group, group_background_n is innermost enclosing a styled group, then a blend_behind operation is performed with inputs: group_background_1_mask_1, group_background_1_color, merged_group_background, and the result placed into a merged_group_background. A blend_behind operation is performed with inputs: group_background_2_mask_1, group_background_2_color, and merged_group_background. The result is placed into merged_group_background, replacing the results of the first blend_revert. This process is repeated for any other layers. Finally, a blend_behind operation is performed with inputs: dest_mask, dest_color, and merged_group_background. The result is placed into merged_group_background. A merged_group_background is used as group_background for this group style.

Following operation 508, or if operation 506 determines that there is not a nested style group, then at operation 510, an empty buffer is established for results of group blending. For example, a destination buffer may be in vector form, and include a destination color and a destination mask. Vector from may include a buffer with a 2-dimensional array of N+1 vectors, where N is the number of channels in the color space (1 for grayscale, 3 for RGB, etc). The array is N+1 because another entry is added to the vector for the mask. At operation 512, for each layer in the styled group, the area is broken up into tiles, and at operation 514, each tile is iterated through for each of the layers to perform blending.

An example general group style three-way blending formula is:

$$screen(layer\_mask, dest\_mask) \rightarrow dest\_mask$$

$$b - (S'^*(b-Z) + ms(1-S)(Z-s))mx' \rightarrow dest\_color$$

In the above formula:
b=group_background_color,
mb=group_background_mask; s=layer_color,
ms=layer_mask; x=dest_color;
mx=dest_mask; mx'=screen(ms, mx)=new dest_mask;
S=screen(mx, mb);
S'=screen(ms,S);H=b−mx*(b−x)/S;N=N(s,H)(where N(s, d) is basic blend function for layer_blend_mode); and
Z=H−ms*N.
H=blend_behind(group_background_mask, group_background_color, dest)
N=blend_general_clipped(layer_mask, layer_color, dest_color, layer_mode)
S'=screen(layer_mask,screen(layer_mask, group_background_mask))
Z=group_background_color−(mask_1*(group_background_color−dest_color)+mask_2*(dest_color−layer_color))/screen(layer_mask, dest_mask)

At operation 516, after all the layers are blended at operation 512, dest will contain buffer such that blend_revert (dest_mask, 1, dest_color, group_background_mask, group_background_color) which is equal to blend_passthrough_group(group_background_mask, group_background_color, layer_1, layer_2, . . . ). The style layer masks may be generated using input dest_mask, which is the combined transparency of the group members. The style layer colors may be user specified. Style layers may also be arbitrary layers with any mask or color.

At operation 518, interior clipped style layers (e.g., inner shadow, inner glow, inner bevel, satin, inner stroke) are generated using known algorithms, applied, and composited onto dest_color (disregarding dest_mask). For example, "blend_general_clipped(clipped_style_layer_1, dest_color, clipped_style_1_mode)→dest_color", and "blend_general_clipped (clipped_style_layer_2, dest_color, clipped_style_2_mode)→dest_color".

At operation 520, exterior style layers (drop shadow, outer glow, outer bevel, outer stroke) are generated and applied using known algorithms, and composited into the group_background. For example: "blend_general (under_style_layer_1, dest,under_style_1_mode)→dest" and "blend_general(under_style_layer_2, dest, under_style_2_mode)→dest".

At operation 522, a final clipped result is obtained with a final blend_revert operation. For example, blend_revert (dest_mask, 1, dest_color, group_background_mask, group_background_color)→(dest_mask, dest_color).

In an example illustration of method 500, where the color space is RGB, underneath a group is a gray background. The group_background_mask is 1.0. The group_background_color is gray. On top of the background is a passthrough group style with two member layers. A first layer is a bottom member layer: where layer_1_color is green, layer_1_mask is 1.0 (in the center of the ellipse), and layer_1_mode is multiply. A second layer is a top member layer, where layer_2_color is green, layer_2_mask is 1.0 (in the center of the ellipse), and layer_2_mode is difference. In this example, gray is shorthand for the RGB vector (0.5, 0.5, 0.5) and green is shorthand for the RGB vector (0, 1, 0). An asterisk "*" with colors indicates a dot product operation, masks are scalars, and an asterisk "*" with mask and scalar indicates standard scalar/vector multiply operation.

First, for the first layer, a gray opaque buffer is placed in a group_background where the group_background_mask is 1.0 and the group_background_color is gray. Second, an empty destination buffer (dest_mask is 0, dest_color is 1) is created. Third, the first group layer member is blended. Group layer blending may be performed by performing a blend_behind, a blend_general_clipped, and another three-way blending formula. The the-way blending formula may sometimes, but not always, reduce to a blend_behind operation.

The first blend_behind is performed with the inputs: group_background_mask, group_background_color, and dest. The result of the blend_behind is stored in the destination buffer. This blend_behind operation is equivalent to: blend_behind(group_background_mask, group_background_color, 0, 1), resulting in dest_mask equals the group_background_mask which equals 1.0, and the dest_color equals group_background_color, which equals gray.

The blend_general_clipped is performed with inputs: layer_mask, layer_color, dest_color, layer_mode. The result of the blend behind is stored in the dest_color buffer. This blend_general_clipped operation is equivalent to blend_general_clipped(1, green, gray, multiply), which is results in gray−1*((1−green)*gray) that reduces to "gray−gray+green*gray." The dest_color then is set to the dot product of RGB vectors green*gray.

The second blend_behind is performed with the inputs: 1.0, layer, and dest. The result of the second blend_behind is stored in the destination buffer.

In this case, because the layer_mask equals 1.0 (because screen(x,1)=1), the dest_mask is equal to 1.0, and the dest_color equals the dot product of RGB vectors green*gray (e.g., the Multiply blend mode function).

Fourth, the second group layer member is blended. Because dest_mask is opaque (e.g., equal to 1.0), so only a single optimized blend_general_clipped operation is needed. The blend_general_clipped is performed with inputs: layer_mask, layer_color, dest_color, and layer_mode. The result of the blend_general_clipped is stored in the dest_color buffer. In this step the inputs to the blend_general_clipped are 1, green, gray, and difference (as in Difference blend mode), which results in the calculation of the absolute value of gray minus green. The result of abs (gray−green), which yields a very dark green, blend_general_clipped. The dest_mask is equal to 1.0.

In the above example, the terms "group_background," "source," and "dest" are n-vectors. A group_background is the result of blending up to the group (the first group member layer), which stays the same during group blending. A source is the first parameter of blending, (e.g., group member layer color/mask). A dest is the second parameter to blending, and the destination of a blending result (e.g., an accumulation buffer color/mask). A source_mask is a transparency of source (0.0 to 1.0, 0.0 is 0%. 1.0 is 100%), and the first vector component of source. A dest_mask is a transparency of dest, result (0.0 to 1.0), and the first vector component of dest. A source_color is a vector of source color channels (0.0 to 1.0, and may be multiple, e.g., one each for R,G,B) and other vector components of the source. A dest_color is a vector of dest color channels (0.0 to 1.0 may be multiple, e.g., one each for R,G,B) and other vector components of dest. Similar conventions are utilized for group_background, and other mask/color vectors. Variable values are between zero and one. The notation "→x", means that a result is produced and stored in x, and x may be a vector.

In the above example, various scalar mask operators are utilized: "multiply_mask(source_mask, dest_mask)→new_dest_mask" is the equivalent of "new_dest_mask=dest_mask*source_mask". For example, multiply_mask(n,1) equals n, and multiply_mask(n,0) equals 0. This is similar to an "and" operation, and represents presence of both dest_mask and source_mask.

Similarly, "screen_mask(source_mask, dest_mask)→new_dest_mask" is the equivalent of "new_dest_mask=dest_mask+source_mask−(dest_mask*source_mask)". For example, screen_mask(n,1) equals 1, and screen_mask(n,0) equals n. This is similar to an "or" operation, and represents the presence of either dest_mask or source_mask.

In the above example, various vector mask operators are utilized.

A "cross_mask(source_mask, dest_mask)→new_source_mask, new_dest_mask" is equivalent to "screen_mask(source_mask,dest_mask)→new_dest_mask" and "new_source_mask=source_mask/new_dest_mask". For example, cross_mask(n,1)=n, 1; and cross_mask(n,0)=1, n.

A "behind_mask(source_mask, dest_mask)→new_source_mask, new_dest_mask" is equivalent to "screen_mask(source_mask,dest_mask)→new_dest_mask" and "new_source_mask=(new_dest_mask−dest_mask)/new_dest_mask". For example, behind_mask(n, 1) equals "0, 1"; and behind_mask(n, 0) equals "1, n".

A "revert_mask(weight_mask, source_mask, dest_mask)→new_source_mask, new_dest_mask" is equivalent to "new_dest_mask=(1−weight_mask)*dest_mask+(weight_mask*source_mask)"; and "new_source_mask=(weight_mask*source_mask)/new_dest_mask". For example, revert_mask(1, n, m) equals "n, 1"; and revert_mask (0, n, m) equals "0, m".

If the source_mask is swapped in for weight_mask, and 1.0 is swapped in for source_mask, the result is a cross_mask: "revert_mask(source_mask, 1.0,dest_mask)→new_dest_mask=(1−source_mask)*dest_mask+source_mask   new_source_mask=source_mask/new_dest_mask".

If dest_mask is swapped in for weight_mask, and 1.0 is swapped in for dest_mask, the result is "revert_mask (dest_mask, source_mask, 1.0)→new_dest_mask=(1−dest_mask)+dest_mask*source_mask new_source_mask=(dest_mask*source_mask)/new_dest_mask".

The new_source_mask is the amount of blended color over the destination, and it is divided by the new_dest_mask, since the new color is in effect multiplied by the new_dest_mask.

In the above example, various scalar blend operators are utilized.

A "blend_normal_clipped(source_mask, source_color, dest_color)→new_dest_color" (e.g., blend source above destination, normal blend, clipped, ignores destination mask) is the equivalent to "new_dest_color=(1−source_mask)*dest_color+source_mask*source_color", which equals "dest_color−source_mask(dest_color−source_color)".

A "blend_general_clipped(source_mask, source_color, dest_color, blend_mode)→new_dest_color" (e.g., general blend of source with source_mask, with blend_mode on top of opaque dest, ignores any dest mask). In other words, dest_mask is preserved in the blend, so dest_mask is placed in new_dest_mask.

Examples of scalar blend operators are:
Normal mode, where "new_dest_color=dest_color−source_mask*(source_color−dest_color)".

Multiply modem where "new_dest_color=dest_color−source_mask*((1−source_color)*dest_color)".

Difference mode, where "new_dest_color=abs(dest_color−source_mask*source_color)" which equals "dest_color−source_mask*(source_color)"

Each blend mode has a formula for its blend mode in terms of source_mask, source_color, and dest_color.

Examples of the asterisk operator "*" include: Multiply N(s,d)=1−s*d; Difference N(s,d)=abs(s−d); and Normal N(s,d)=s.

In the above example, vector blend operators are utilized.

A blend_revert(weight_mask, dest_mask, dest_color, source_mask, source_color)→"new_dest_mask, new_dest_color" (e.g., a weighted average of source/dest, based on revert_mask) is the equivalent of revert_mask (weight_mask, source_mask, dest_mask)→"new_source_mask, new_dest_mask", and blend_normal_clipped(source_mask, dest_color, new_source_mask)→new_dest_color A blend_behind(source_mask, source_color, dest_mask, dest_color)→"new_dest_mask, new_dest_color" (e.g., blend source behind destination) is the equivalent of behind_mask (source_mask, dest_mask)→"new_source_mask, new_dest_mask", and blend_normal_clipped(source_mask, dest_color, new_source_mask)→new_dest_color.

A blend_general(source_mask, source_color, dest_mask, dest_color, blend_mode)→"new_dest_mask, new_dest_color" (e.g., blend source behind destination, with general blending function, blend_mode) is the equivalent of blend_general_clipped(source_mask, source_color, dest_color, blend_mode)→dest_color_1, and blend_behind (source_mask, source_color, dest_mask, dest_color_1) →"new_dest_mask, new_dest_color".

If color and mask come from the same buffer, these may be abbreviated for brevity and clarity. For example, "dest_mask, dest_color" may be written simply as "dest." For example, "blend_general(source_mask, source_color, dest_mask, dest_color, blend_mode)→new_dest_mask, new_dest_color" may be written as "blend_general(source, dest, blend_mode)→new_dest".

Example Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations as described herein. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time. The processor may be temporary configured or permanently configured to perform relevant operations. Whether temporarily configured or permanently configured, such processors may constitute processor-implemented modules that operate to perform one or more operations or functions.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Formula Derivation for Group Style Blending

The following process is an example of derivations that may be utilized to enhance (e.g., optimize) an example embodiment of the blending procedures discussed herein.

If a src=layer 1, a dest mask=0, and a dest color=100% blend against background, then dest mask=src mask (screen (src,dest)).

If src=layer 2, dest color=100% blend against background where dest mask=0, then dest mask=src mask where dest mask=0 (screen(src,dest)).

If dest color=dest color (0% src blend against background) where src mask=0, then dest mask=dest mask (0% src mask) where src mask=0 (screen(src, dest)).

If dest color=an unknown percentage where dest and src mask, need some dest and some background, then dest mask=screen(dest, src) where dest and src mask.

Therefore, the mask is not at issue, but color is. The dest mask screen matches with blend_behind and normal (e.g., all modes except revert).

To solve for dest_color s.t.: blend_revert(dest_mask, 100, dest_color, back)=blend(layer_2, blend(layer_1, back)), and blend(layer_1, back)=blend_behind(layer_1, blend_general(layer_1, back)).

To substitute multiply for blend_general, where Multiply blend mode (clipped version) is d=d−m(1−s*d):
src=11=mf,1; dest mask=0; dest color=100% blend against background=1−(1−1)*b; and dest mask=src mask (screen (src,dest))=mf To find src=12=m2, 12
dest color=100% blend against background where dest mask=0
dest mask=src mask where dest mask=0 (screen(src, dest))
dest color=dest color (0% src blend against background) where src mask=0
dest mask=dest mask (0% src mask) where src mask=0 (screen(src, dest))
dest color=?% where dst and src mask, need some dest and some background
dest mask=screen(dest, src) where dst and src mask Basic formulas for reference: s,d, d' are n-vectors in a color space such as rgb; and md, ms are scalars that represent masks. These formulas are for single "pixels", a layer would be blended by iterating the formulas over all of its pixels.

screen(s,d)=md+ms−md*ms screen(0,x)=screen(x,0)=x screen(1,x)=screen(x,1)=1 revert(mw,ms,s,md,d)(general revert w*ms,md,weight-mask)

md'=(1−mw)md+w*ms ms'=ms*mw/md' d'=d−ms'(d−s)=d−ms(d−s)/(md+ms−md*ms)

normal(s,d)(revert sw/source mask,w=src mask,ms=1)=normal md'=screen(ms,md)=(1−ms)md+ms=md+ms−md*ms=S ms'=ms/md'=ms/(md+ms−md*ms)

d'=d−ms'(d−s)=d−ms(d−s)/(md+ms−md*ms)

behind(ms,s,md,d)

md'=screen(ms,md)

ms'=[(md'−md)/md']=(ms−md*ms)/(md+ms−md*ms)

d'=d−ms'(d−s)=[d−(ms−md*ms)(d−s)/(md+ms−md*ms)]=d−ms(1−md)(d−s)/(md+ms−md*ms)

blend_clipped(ms, s, d, N) where N is blending function of s and d, such as: Multiply(s,d)=1−s*d, Difference(s,d)=abs(s−d), and Normal(s,d)=s d'=d−ms*N(s,d)

md'=md blend_general(ms,s,md,d,N)

md'=screen(ms,md)

d'=behind(ms,s,md,blend_clipped(ms,s,d,N))

Assuming a background with color b, and mask mb, and where there is a desire to blend in a layer with color f, and mask mf, with blend mode (function) M. blend(mf, f, mb, b, M) yields:

md=S=screen(mf,mb)

$$d = b - mf*M - mf(1-mb)(b-mf*M-f)/S \quad \text{(Equ. 0)}$$

Letting T be the screen of all the member layer masks blended so far, express the blend as a revert operation with mask T, and color x, against the background color, b.

revert(T,x,b)=revert(mf,x,b)

This is to say, when reverting with the screen of the member layers (e.g., screen excluding background), x is what color needs to be in order for revert w/mf and b to work.

S=screen(T,mb)(T screened w/background mask), which equals b−T(b−x)/S.

Solving for x:

b−T(b−x)/S=b−mf*M−mf(1−mb)(b−T*M−f)/S mf(b−x)=S*mf*M+mf(1−mb)(b−mf*M−f)

b−x=SM+(1−mb)(b−mf*M−f)

Therefore: $x = b - SM - (1-mb)(b-mf*M-f)$ (Equ. 1)

And, $$d = b - mf*M - mf(1-mb)(b-mf*M-f)/S$$
$$= b - mf*(M - mf(1-mb)(b-mf*M-f)/S)$$

So: $d = b - mf*(b-x)/S = b - T*(b-x)/S$ (Equ. 2)

Now add another layer on top of md, d w/blend mode N. (md, d is dest after blending layer f)

blend(mg, g, md, d, N) = behind(f, blend_N(mf, f, b))

basic blend is N(g, d) = N blend_N(mg, g, d) = d − mg * N(with masking, d input for behind)

$$md' = S'$$
$$= \text{screen}(md, mg)$$
$$= \text{screen}(\text{screen}(mf, mb), mg))$$
$$= \text{screen}(S, mg)$$

$$d' = (d - mg*N) - mg(1-md)((d-mg*N)-g)/S'$$

substituting for d using(Equ. 2):

$$= b - T*(b-x)/S - mg*N -$$
$$mg(1-md)(b-T*(b-x)/S - mg*N - g)/S'$$

We now also express the blend of g, blend(mg,g,md,d,N), as a revert operation, revert(T',x',b). T' is the screen of all the member layers so far (similar to T above), and S' is the screen of all layers so far and the background (similar to S above) x' is what color needs to be for revert w/T' (group member layer screen) to work:

d'=b−T'(b−x')/S'

S'=screen(mb,mg,md)

solving for x' b−T'(b−x')/S'=b−T*(b−x)/S−mg*N−mg(1−md)(b−T*(b−x)/S−mg*N−g)/S'

$$T'(b-x')/S'=T*(b-x)/S+mg*N+mg(1-md)(b-T*(b-x)/S-mg*N-g)/S'$$

$$T'(b-x')=S'(T*(b-x)/S+mg*N)+mg(1-md)(b-T*(b-x)/S-mg*N-g)$$

$$b-x'=(S'(T*(b-x)/S+mg*N)+mg(1-md)(b-T*(b-x)/S-mg*N-g))/T'$$

$$x'=b-(S'(T*(b-x)/S+mg*N)+mg(1-md\ b-T*(b-x)S-mg*N-g))/T' \quad \text{(Equ. 4)}$$

$$mx'=T'=\text{screen}(mg,T) \quad \text{(Equ. 4.1)}$$

We now have the color and the mask of the group blend (mx', x') in terms of mb,b; md,d; and mg,g. That is the backdrop mask and color, the current group blending result mask and color, and the current layer mask and color.

Note that if T=0 and T=mg, (S'=screen(mb,T')=mb)

$$x'=b-S'N-(1-md)(b-mg*N-g) \quad \text{(Equ. 5)}$$

which is similar to $$x=b-SM-(1-mb)(b-mf*M-f) \quad \text{(Equ. 1)}$$

so x' is consistent with x (starting out with no dest mask).

At each iteration, only the color of the background (b), the background mask (mb), the current dest (x), and the dest mask are known. (T screen of member layers up to, but not including current layer), and the current layer (g) and current mask (mg). So the full modified blending formula can be expressed as:

$$x'=b-(S'(T*(b-x)/S+mg*N)+mg(1-md)(b-T*(b-x)/S-mg*N-g))/T \quad \text{(Equ. 6)}$$

$$mx'=T'$$

Alternatively, in terms of current source, (ms, s), current (modified) dest, (mx,x), and background, (mb,b).

$$mx'=\text{screen}(ms,mx)$$

$$x'=b-(S'^*(mx^*(b-x)/S+ms^*N)+ms(1-S)(b-mx^*(b-x)/S-ms^*N-s))/mx' \quad \text{(Equ. 7)}$$

Where:
S=md=screen(mx, mb)
S'=screen(md, mb)=screen(ms, mx, mb)
T=mx (dest mask before blend)
T'=screen(mx, ms)=mx'(dest mask after blend)
H=b-mx*(b-x)/S (b behind x, or reversion of x against b with mask mx)
N=N(s,H)=N(s, b-mx*(b-x)/S)

Basic blend against "orig" dest, also known as "reverted dest" (e.g., against background), we need to revert (mx,x) to background before applying the blend mode.

If: Z=b-mx*(b-x)/S-ms*N=H-ms*N; then the general blending formula can be expressed as:

$$x'=b-(S'^*(b-Z)+ms(1-S)(Z-s))/mx' \quad \text{(Equ. 8)}$$

Special cases may be utilized to enhance, e.g., optimize, blending.

1) mx=1 (mx'=1, S=1, S'=1) [fully opaque destination]

$$\begin{aligned}
x' &= b - (S' *(mx*(b-x)/S + ms*N) + \\
&\quad ms(1-S)(b - mx*(b-x)/ \\
&\quad S - ms*N - s))/mx' \\
&= b - S' *(b - x + ms*N)/mx' \\
&= b - (b-x) + ms*N \\
&= x - ms*N \\
&= x - ms*N(s, H) \\
&= x - ms*N(s, b - mx*(b-x)/S) \\
&= x - ms*N(s, x) \\
&= \text{blend } s, \text{ against opaque } x
\end{aligned} \quad \text{(Equ. 9.1)}$$

(the background can be ignored)

$$mx = 1, S = 1$$
$$mx' = 1, S' = 1, S = 1$$

2) mx=0 (mx'=ms, S=mb, S'=screen(ms,mb)) [fully transparent destination]

$$\begin{aligned}
x' &= b - (S' *(mx*(b-x)/S + ms*N) + \\
&\quad ms(1-S)(b - mx*(b-x)/S - ms*N - s))/mx' \\
x' &= b - (S' *ms*N + ms(1-S)* \\
&\quad (b - ms*N - s))/md'mx \\
&= 0 \\
&= b - (S'*N + (1-mb)*(b-ms*N-s))md' \\
&= ms, S \\
&= mb \\
&= b - S'*N - (1-mb)*(b-ms*N-s)
\end{aligned} \quad \text{(Equ. 9.2)}$$

plug-in to revert formula:

$$\begin{aligned}
b - mx'*(b-x')/S' &= b - mx'*(b - (b - S'*N - (1-mb)* \\
&\quad (b - ms*N - s)))/S' \\
&= b - ms*(S'*N + (1-mb)* \\
&\quad (b - ms*N - s))/S' \\
&= b - ms*N - ms*(1-mb)*(b-ms*N-s)/S'
\end{aligned}$$

actual blend formula for s into b (blend, blend behind)

$$=b-ms*N-ms(1-mb)(b-ms*N-s)/S'(1), \quad (9.2.1)$$

$$N(s,H)=N(s,b-mx*(b-x)/S)=N(s,b-(b-x))=N(s,b)$$

So mx=0 reduces to x blended against b, then reverted w/md' against background.

3) ms=0 (S'=S, mx'=mx) [fully transparent source]

$$\begin{aligned}
x' &= b - (S' *(mx*(b-x)/S + ms*N) + \\
&\quad ms(1-S)(b - mx*(b-x)/S - ms*N - s))/mx' \\
&= b - (S' *(mx*(b-x)/S))/mx'
\end{aligned} \quad \text{(Equ. 9.3)}$$

-continued $$= b - (mx * (b - x))/mx'$$

$$= b - (b - x)$$

$$= x \text{ [destination is left unmodified as expected]}$$

4) mb=0 (S=mx, S'=mx')

$$\begin{aligned} x' &= b - (S' * (mx*(b-x)/S + ms*N) + \\ & ms(1-S)(b - mx*(b-x)/S - ms*N - s))/mx' \\ &= b - (mx' * (mx*(b-x)/mx + ms*N) + \\ & ms(1-mx)(b - mx*(b-x)/mx - ms*N - s))/mx' \\ &= b - (mx' * ((b-x) + ms*N) + \\ & ms(1-mx)(b - (b-x) - ms*N - s))/mx' \\ &= b - (mx' * ((b-x) + ms*N) + \\ & ms(1-mx)(x - ms*N - s))/mx' \\ &= b - ((b-x) + ms*N) - \\ & ms(1-mx)(x - ms*N - s))/mx' \\ &= (x + ms*N) - ms(1-mx)(x - ms*N) - s))/mx' \\ &= s \text{ blended against } x \\ & \text{[blended as if there was no background]} \end{aligned}$$ (Equ. 9.4)

$$\begin{aligned} N &= N(s, H) \\ &= N(s, b - mx*(b-x)/S) \\ &= N(s, b - (b-x)) \\ &= N(s, x) \end{aligned}$$

5) ms=1, (S'=1, mx'=1) [Fully opaque source]

$$\begin{aligned} x' &= b - (S' * (mx*(b-x)/S + ms*N) + \\ & ms(1-S)(b - mx*(b-x)/S - ms*N - s))/mx' \\ &= b - ((mx*(b-x)/S + N) + \\ & (1-S)(b - mx*(b-x)/S - N - s)) \\ &= b - mx*(b-x)/S - N - \\ & (1-S)(b - mx*(b-x)/S - N - s)(7.5) \\ &= (b - mx*(b-x)/S - N) - \\ & (1-S)((b - mx*(b-x)/S - N) - s) \\ &= Z - (1-S)(Z - s) \end{aligned}$$ (Equ. 9.5)

6) N=N(s, H)=Normal(s, H)=H−s (use Normal as the blending mode)

$$H = b - mx*(b-x)/S$$ (Equ. 9.5)

$$\begin{aligned} x' &= b - (S' * (mx*(b-x)/S + ms*N) + \\ & ms(1-S)(b - mx*(b-x)/S - ms*N - s))/mx' \\ &= b - (S' * (b - H + ms*(H-s)) + \\ & ms(1-S)(H - ms*(H-s) - s))/mx' \\ &= b - (S'*b - S'*H + S'*ms*H - s*S' + \\ & (ms - ms*S)(H - ms*H + ms*s - s))/mx' \\ &= b - (S'*b - S'*H + S'*ms*H - s*S' + ms*H - \\ & ms*ms*H + ms*ms*s - ms*s - \\ &= b - (((p + k - k*p) + m - m*(p + k - k*p)) * \\ & (b - h + m*(h-s)) + m* \\ & (1 - (p + k - k*p))(h - m*(h-s) - s))/(m + p - m*p) \\ &= b - (S'*b - S'*H + S'*ms*H - s*S' + \\ & (m - m*S)(H - m*H + ms*s - s))/mx' \\ &= b - ((mx*(b-x)/S + N) + \\ & (1-S)(b - mx*(b-x)/S - N - s)) \\ &= b - mx*(b-x)/S - N - \\ & (1-S)(b - mx*(b-x)/S - N - s)(7.5) \\ &= (b - mx*(b-x)/S - N) - \\ & (1-S)((b - mx*(b-x)/S - N) - s) \\ &= Z - (1-S)(Z - s) \end{aligned}$$

6) An example with non-trivial masks:

$$\begin{aligned} ms &= .5, \\ mx &= .4, \\ mb &= .3, \\ (S &= .58, S' = .79, ms*(1-S) = .21, mx' = .7) \end{aligned}$$ (Equ. 9.5)

$$\begin{aligned} x' &= b - (S' * (mx*(b-x)/S + ms*N) + \\ & ms(1-S)(b - mx*(b-x)/S - ms*N - s))/mx' \\ x' &= b - (.79 * (.4*(b-x)/.58 + .5*N) + \\ & .21(b - .5*(b-x)/.58 - .5*N - s))/.7 \\ &= b - (.316*(b-x)/.58 + .395*N + .21b - \\ & .105*(b-x)/.58 - .105*N - .21s)/.7 \\ &= b - (.211*(b-x)/.58 + .29*N + .21b - .21s)/.7 \\ &= b - (.211/.58*b + .21b - .211/.58*x + \\ & .29*N - .21s)/.7 \\ &= .1802955665*b + .5197044335*x - .4142857143*N + .3s \end{aligned}$$

Now to calculate a general case in code, so as to simplify the operations:

$$x' = b - (S'*(mx*(b-x)/S + ms*N) + ms(1-S)(b - mx*(b-x)/S - ms*N - s))/mx'$$ (Equ. 7)

S=md=screen(mx,mb)=mx+mb−mx*mb
S'=screen(md,mb)=screen(ms,mx,mb)=screen(ms,S)=ms+S−ms*S
mx'=screen(mx,ms)=mx+mx−ms*mx (dest mask after blend)
R=b−mx*(b−x)/S=revert(mx,x,b)=d Original d, as if the blending had been done in the normal way, such as putting the background behind dest, provides (original) d. The revert_mask operation provides:

$$S = \text{screen}(mx, mb) = S = \text{dest mask}$$

and $$mx/S = mx/\text{screen}(mx, mb) = \text{source mask}$$

$$N = N(s, b - mx*(b-x)/S) = N(s, R) = N(s, d)$$

A basic blend against "orig" dest, also known as "reverted dest" (e.g., against background), a revert (mx,x) to background is needed, before applying the blend mode.

$$Z = R - ms*N(\text{blended revert, blend clipped})$$

Next calc R and N, at least. As a result S, mx/S is provided without additional cost out of the revert mask operation needed for R. Expansions and simplifications can cut down on clutter, where: S'=d, S=c, ms=m, mx=p, mx'=q, Z=z, b=b, s=s.

$$q = \text{screen}(p, m) = (p + m - m*p)$$

$$d = \text{screen}(c, m) = (m + c - m*c)$$

$$x' = b - (d*(b-z) + m(1-c)(z-s))/q$$

The letters b, z, and s are vectors (in a color space, with an entry per color channel), and letters m, c, and p are scalars (masks). It is useful to perform as many mask calculations up front as possible, keeping precision, since we can re-use the mask for each color channel.

Example Machine Architecture and Machine-Readable Medium

Figure 6:
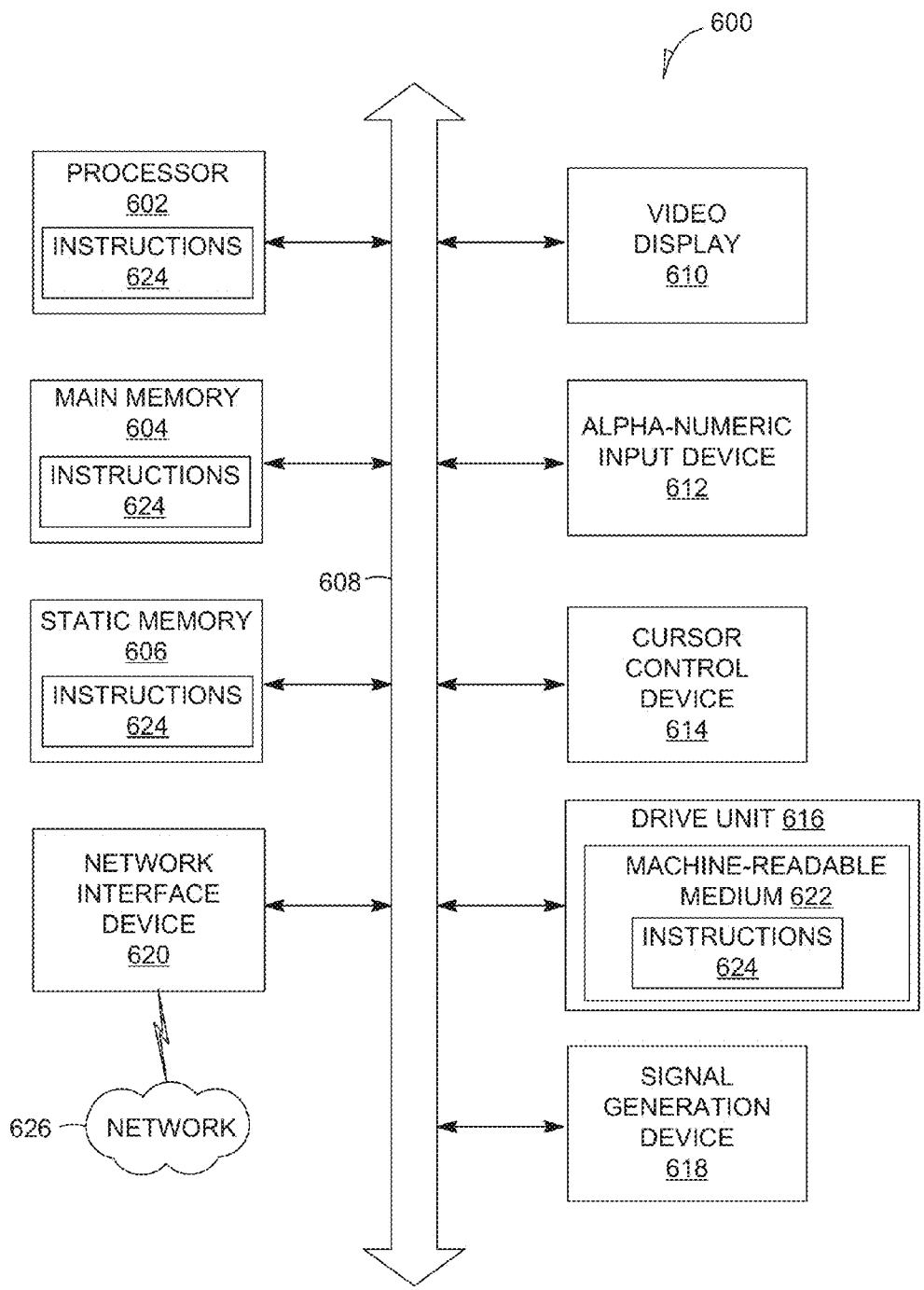
FIG. 6 is a simplified block diagram of a machine in an example form of a computing system within which a set of instructions for causing the machine to perform any one or more of the methodologies discussed herein may be executed.

With reference to FIG. 6, an example embodiment extends to a machine in the example form of a computer system 600 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alphanumeric input device 612 (e.g., a keyboard), a user interface (UI) navigation device or cursor control device 614 (e.g., a mouse), a disk drive unit 616, a signal generation device 618 (e.g., a speaker), and a network interface device 620.

Example Machine-Readable Storage Medium

The disk drive unit 616 includes a machine-readable storage medium 622 on which is stored one or more sets of instructions 624 and data structures (e.g., software instructions) embodying or used by any one or more of the methodologies or functions described herein. The instructions 624 may also reside, completely or at least partially, within the static memory 606, main memory 604 or within the processor 602 during execution thereof by the computer system 600, with the main memory 604 and the processor 602 also constituting machine-readable media.

While the machine-readable storage medium 622 is shown in an example embodiment to be a single medium, the term "machine-readable storage medium" may include a single medium or multiple media (e.g., a centralized or distributed database, or associated caches and servers) that store the one or more instructions 624. The term "machine-readable storage medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Example Transmission Medium

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. As used herein, the term "or" may be construed in either an inclusive or exclusive sense. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer implemented method for blending a plurality of layers in a group, each layer including image data, the method comprising:
   establishing a group buffer to store image data, the group buffer being initially empty;
   identifying a group that includes a plurality of layers and a group background;
   repeating the following three steps for each of the plurality of layers in the group until all layers in the plurality of layers are processed to produce a preliminary group result:
   (1) blending the group background behind the group buffer, and storing a result of the blending in the group buffer,
   (2) blending image data from a layer of the plurality of layers on top of the group buffer while ignoring a transparency of the image data to produce a group result, and
   (3) factoring out the group background from the group result;
   after all layers in the plurality of layers are processed to produce the preliminary group result comprising the plurality of layers blended together, applying a style to the preliminary group result to produce an intermediary group result; and
   blending the group background behind the intermediary group result to produce a final group result, wherein a transparency of the final group result is such that the style is clipped to the image data of the final group result.

2. The method of claim 1, wherein the style is clipped to the plurality of layers at a boundary of the plurality of layers after blending the group background behind the intermediary group result.

3. The method of claim 1, wherein the blending of the group background behind the intermediary group result is performed independently of the group background behind the plurality of layers.

4. The method of claim 1, wherein each of the plurality of layers includes a color value and a mask value.

5. The method of claim 1, comprising setting the final group result to have a combined shape of the plurality of layers.

6. The method of claim 1, comprising: dividing the plurality of layers into a plurality of tiles, and blending each layer of the plurality of layers in the plurality of tiles independently.

7. A method of blending groups of image layers using a processor of a machine, the processor being coupled to an accumulation buffer, comprising:
   identifying a group that includes a plurality of image layers, a style effect to be applied to the group, and a background disposed behind the group;
   blending the background behind an initial result stored in the accumulation buffer to generate an intermediate result, the initial result being initially empty;
   blending the intermediate result and a first image layer of the plurality of image layers into the accumulation buffer according to a first blend mode, and re-blending the background behind the intermediate result in the accumulation buffer to generate an updated result;
   blending the updated result with a second image layer of the plurality of image layers into the accumulation buffer according to a second blend mode, and re-blending the background behind the updated result in the accumulation buffer to form a re-blended result;
   setting the re-blended result in the accumulation buffer to have a combined shape of the first image layer and the second image layer, such that the accumulation buffer does not include a shape from the background to generate a revised result;
   blending the style effect with the revised result in the accumulation buffer based on the combined shape of the revised result to generate a semi-final result; and
   merging the semi-final result with the background to form a final result.

8. The method of claim 7, wherein the first blend mode ignores a transparency level of the intermediate result in the accumulation buffer.

9. The method of claim 7, wherein blending the style effect with the revised result in the accumulation buffer ignores a group transparency mask.

10. The method of claim 7, wherein the blending the style effect with the revised result is performed independently of the background behind the result in the accumulation buffer.

11. The method of claim 7, wherein each individual layer includes a color value and a mask value.

12. The method of claim 7, comprising: dividing the first image layer and the second image layer into a plurality of tiles, and blending the first image layer and the second image layer in each tile of the plurality of tiles independently of other tiles.

13. A non-transitory machine-readable storage medium in communication with at least one processor, the machine-readable storage medium storing instructions which, when executed by the at least one processor of a machine, causes the machine to perform operations comprising:
   establishing a group buffer to store image data, the group buffer being initially empty;
   identifying a group that includes a plurality of layers and a group background;
   repeating the following three steps for each of the plurality of layers in the group until all layers in the plurality of layers are processed to produce a preliminary group result:
   (1) blending the group background behind the group buffer, and storing a result of the blending in the group buffer,
   (2) blending image data from a layer of the plurality of layers on top of the group buffer while ignoring a transparency of the image data to produce a group result, and
   (3) factoring out the group background from the group result;
   after all layers in the plurality of layers are processed to produce the preliminary group result comprising the plurality of layers blended together, applying a style to the preliminary group result to produce an intermediary group result; and blending the group background behind the intermediary group result to produce a final result wherein a transparency of the final group result is such that the style is clipped to the image data of the final group result.

14. The non-transitory machine-readable storage medium of claim 13, wherein the style is dipped to the plurality of layers at a boundary of the plurality of layers after blending the group background behind the intermediary group result.

15. The non-transitory machine-readable storage medium of claim 13, wherein the blending the group background behind the intermediary group result is performed independently of the background behind the plurality of layers.

16. The non-transitory machine-readable storage medium of claim 13, the operations further comprising: setting the final group result to have a combined shape of the plurality of layers that does not include a shape of the background.

17. A system comprising:
   at least one processor of a machine operable to store graphic elements in one or more buffers; and
   a graphics module operable to execute on the at least one processor, the graphics module being configured to:
   establish a group buffer to store image data, the group buffer being initially empty;
   identify a group that includes a plurality of layers and a group background;
   repeating the following three steps for each of the plurality of layers in the group until all layers in the plurality of layers are processed to produce a preliminary group result:
      (1) blend the group background behind the group buffer, and storing a result of the blending in the group buffer,
      (2) blend image data from a layer of the plurality of layers on top of the group buffer while ignoring a transparency of the image data to produce a group result, and
      (3) factor out the group background from the group result;
   after all layers in the plurality of layers are processed to produce the preliminary group result comprising the plurality of layers blended together, apply a style to the preliminary group result to produce an intermediary group result; and
   blend the group background behind the intermediary group result to produce a final result wherein a transparency of the final group result is such that the style is clipped to the image data of the final group result.

18. The system of claim 17, wherein the style is clipped to the plurality of layers at a boundary of the plurality of layers after blending the group background behind the intermediary group result.

19. The system of claim 17, wherein the blending the group background behind the intermediary group result is performed independently of the background behind the plurality of layers.

20. The system of claim 17, the graphics module further configured to: set the final group result to have a combined shape of the plurality of layers that does not include a shape of the background.

\* \* \* \* \*